(12) United States Patent
Stoller et al.

(10) Patent No.: US 8,168,155 B2
(45) Date of Patent: May 1, 2012

(54) METHOD FOR PRODUCTION OF AMMONIUM PARATUNGSTATE TETRAHYDRATE AND HIGHLY PURE AMMONIUM PARATUNGSTATE TETRAHYDRATE

(75) Inventors: Viktor Stoller, Bad Harzburg (DE); Michael Erb, Salzgitter (DE); Juliane Meese-Marktscheffel, Goslar (DE); Michael Lohse, Goslar (DE); Wolfgang Mathy, Langelsheim (DE)

(73) Assignee: H.C. Starck GmbH (DE)

( * ) Notice: Subject to any disclaimer, the term of this patent is extended or adjusted under 35 U.S.C. 154(b) by 0 days.

(21) Appl. No.: 12/524,968

(22) PCT Filed: Jan. 29, 2008

(86) PCT No.: PCT/EP2008/051000
§ 371 (c)(1),
(2), (4) Date: Aug. 19, 2009

(87) PCT Pub. No.: WO2008/092838
PCT Pub. Date: Aug. 7, 2008

(65) Prior Publication Data
US 2010/0028250 A1    Feb. 4, 2010

(30) Foreign Application Priority Data
Feb. 2, 2007    (DE) .......................... 10 2007 005 287

(51) Int. Cl.
*C01G 41/02*    (2006.01)

(52) U.S. Cl. ................................. 423/594.13

(58) Field of Classification Search .............. 423/594.13
See application file for complete search history.

(56) References Cited

U.S. PATENT DOCUMENTS

| 4,092,400 A | 5/1978 | Zbranek et al. |
| 4,115,513 A | 9/1978 | Kulkarni et al. |
| 4,450,144 A * | 5/1984 | Laferty et al. .................. 423/54 |
| 6,113,868 A | 9/2000 | Mathy et al. |

FOREIGN PATENT DOCUMENTS

| DE | 1150962 | 7/1963 |
| DE | 1244141 | 7/1967 |
| DE | 19628816 A1 | 1/1998 |
| DE | 19724183 A1 | 1/1998 |

OTHER PUBLICATIONS

English language translation of Hempel et al. "Solubility and Stable Crystal Hydrates in the System Ammonium Paratungstate and Water", Kristall und Technik, vol. 2, Issue 3, 1967.*
van Put, John W. "Crystallization and Processing of Ammonium Paratungstate (APT)" Int. J. of Refractory Metals and Hard Materials 13 (1995), 61-76.*
U.S. Appl. No. 12/524,976, filed Jul. 29, 2009, Viktor Stoller et al.

(Continued)

*Primary Examiner* — Stanley Silverman
*Assistant Examiner* — Anthony J Zimmer
(74) *Attorney, Agent, or Firm* — Connolly Bove Lodge & Hutz LLP

(57) ABSTRACT

The invention is directed to a method for the production of ammonium paratungstate tetrahydrate by thermal treatment of ammonium paratungstate decahydrate in an aqueous suspension. The ammonium paratungstate tetrahydrate can be produced with high purity and high yield. The production method may furthermore be carried out in a simple and energy-efficient manner.

18 Claims, 2 Drawing Sheets

OTHER PUBLICATIONS

U.S. Appl. No. 12/524,957, filed Jul. 29, 2009, Viktor Stoller et al.

Kirilenko, et al. "In Situ XAS and XRD Studies on the Structural Evolution of Ammonium Paratungstate During Thermal Decomposition". Eur. J. Inorg. Chem. 2005, pp. 2124-2133.

Zhang Qixiu, et al. "New Process for Production of High-Purity Ammonium Paratungstate from Tungsten Slimes with High Content of Impurities". J. Cent.-South Inst. Min. Metall, 1990, vol. 21, No, 4, pp. 389-396.

Put Van, et al. "Formation of ammonium paratungstate tetra- and hexa-hydrate. I:stability", Hydrometallurgy, vol. 34, 1993, pp. 187-201.

Yunjiao, et al., "Preparation of Ammonium Paratungstate with Coarse Grain by Evaporating Crystallization", J. Cent. South Univ. Technol., vol. 4, 1997, No. 1, pp. 32-35.

French, et al. "A re-investigation of the thermal decomposition of ammonium paratungstate". Journal of Materials Science, vol. 16, 1981, pp. 3427-3436.

Basu, et al. "Characterization of various commercial forms of ammonium paratungstate powder". Journal of Materials Science, vol. 10, 1975, pp. 571-577.

Hempel et al, "Loeslichkeit und stabile Kristallhydrate im System Ammoniumparawolframat-Wasser". Kristall und Technik, vol. 2, No. 3, 1967, pp. 437-445.

Raddatz, et al., "Preparation of Ammonium Paratungstate From a Sodium Tungstate-Sodium Sodium Chloride Phase". PB88-230925, Report of Investigations 9165, 1988, pp. 1-10.

Petrov, et al. "Use of extraction by amines during the preparation of ammonium paratungstate". Tsvetnye Metally (Moscow, Russian Federation), vol. 3, 1974, pp. 38-39.

Kholmogorov, et al., "Anionexchange method for preparation of ammonium paratugstate from soda solutions" (Moscow, Russian Federation), Tsvetnye Metally, vol. 7, 1978, pp. 59-62.

"Tungsten properties chemistry, technology of the element, alloys, and chemical compounds", ISBN 0-306-45053-4, 1999, pp. 184-212.

* cited by examiner

METHOD FOR PRODUCTION OF AMMONIUM PARATUNGSTATE TETRAHYDRATE AND HIGHLY PURE AMMONIUM PARATUNGSTATE TETRAHYDRATE

RELATED APPLICATIONS

This application is a national stage application (under 35 U.S.C. §371) of PCT/EP2008/051000, filed Jan. 29, 2008, which claims benefit of German application 10 2007 005 287.3, filed Feb. 2, 2007.

BACKGROUND OF THE INVENTION

The present invention relates to a process for preparing ammonium paratungstate tetrahydrate and also ammonium paratungstate tetrahydrate having a very high purity.

Ammonium paratungstate hydrates (hereinafter referred to as APTs) are known intermediates for producing tungsten metal, tungsten-containing catalysts or hard materials based on tungsten, for example tungsten carbides, or sputtering targets. The latter application requires a particularly high purity of the APT.

The preparation of highly pure APT is carried out essentially via acid or alkali digestion or fusion of tungsten-containing concentrates or tungsten scrap with subsequent purification stages involving precipitation processes and liquid-liquid extraction. The purified solution is generally concentrated by evaporation, resulting in APT finally crystallizing out.

According to the prior art, tungsten ore concentrates (e.g. scheelite, tungstite) and W-containing scrap are digested with sodium carbonate and/or sodium hydroxide. The Na tungstate solution formed is freed of Si, P, F, Mo, As, Sb, Bi, Co etc. in a preliminary purification in a number of steps by means of precipitation or ion-exchange processes. The sodium tungstate solution is subsequently converted into ammonium tungstate solution by liquid-liquid extraction using amine-containing organic phases. APT is prepared from this solution by evaporative crystallization.

As an alternative, the purification and conversion process of the digestion solutions is, for example, carried out industrially by means of ion-exchange resins in China or Uzbekistan. Here, tungsten and molybdenum are taken up by an exchanger while impurities such as Si, P and As remain in the raffinate. Tungsten is subsequently separated from molybdenum by selective elution. APT is likewise produced from the tungsten-containing eluate by evaporative crystallization. Typical impurity contents of the APT products prepared in this way are shown in Table 2 in the examples.

Products prepared in this way typically have a purity of from 99.9 to 99.99% by weight (3-4N).

Detailed descriptions of previously known processes for preparing APT are described in DE-B-1,244,141, DE-A-196 28 816, DE-C-197 24 183 and U.S. Pat. No. 4,115,513 and also in the publications "Anion exchange method for preparation of ammonium paratungstate from soda solutions, Kholmogorov, Vaneeva, Yurkevich, Tsvetnye Metally (Moscow, Russian Federation) 7/1978, pp. 59-62", "Use of extraction by amines during the preparation of ammonium paratungstate, Petrov, Maslenitskii, Davydova, Tsvetnye Metally (Moscow, Russian Federation) 3/1974, pp. 38-39", "New process for production of high purity ammonium paratungstate from tungsten siimes with high content of impurities, Zhang, Gong, Huang, Huang, Zhongnan Kuangye Xueyuan Xuebao (1990), 21(4), 389-96", "Preparation of Ammonium Paratungstate from a Sodium Tungstate-Sodium Chloride Phase, Raddatz, Gomes, Carnahan, Rep. Invest. US, Bur. Mines (1988), RI 9165" and also in the book "TUNGSTEN Properties Chemistry, Technology of the Element, Alloys, and Chemical Compounds (ISBN 0-306-45053-4, 1999), Lassner, Schubert, pp. 184-212.

In typical processes of the prior art, W concentrate is digested with sodium hydroxide or sodium carbonate and the resulting solution is freed of impurities such as P, As, Si, V and Mo in a preliminary purification with addition of Mg salts, Al salts and sodium hydrogensulfide. The sodium tungstate solution is subsequently purified by means of liquid-liquid extraction using an organic phase (e.g. containing 7-10% by weight of diisotridecylamine, 10% by weight of isodecanol, balance: petroleum spirit) and converted into ammonium tungstate solution. This solution is fractionally evaporated and the APT formed is separated off, washed and dried. Typical impurity contents of an APT product prepared in this way are shown in Table 1 in the examples.

A great disadvantage of the previously known processes is that the purity of the products which can be prepared thereby is insufficient for specific applications, e.g. for sputtering targets. In addition, the APT manufacturing costs are very high because of the high energy consumption of the evaporative crystallization.

BRIEF SUMMARY OF THE INVENTION

The invention is related to a process for preparing ammonium paratungstate tetrahydrate which comprises converting ammonium paratungstate decahydrate suspended in an aqueous phase into ammonium paratungstate tetrahydrate by heating.

In the light of this prior art, it is an object of the present invention to provide an economical process which allows a highly pure ammonium paratungstate tetrahydrate to be prepared in a high product yield in a simple process.

A further object of the invention is to provide an ammonium paratungstate tetrahydrate having a very high purity.

DETAILED DESCRIPTION OF THE INVENTION

Figure 1:
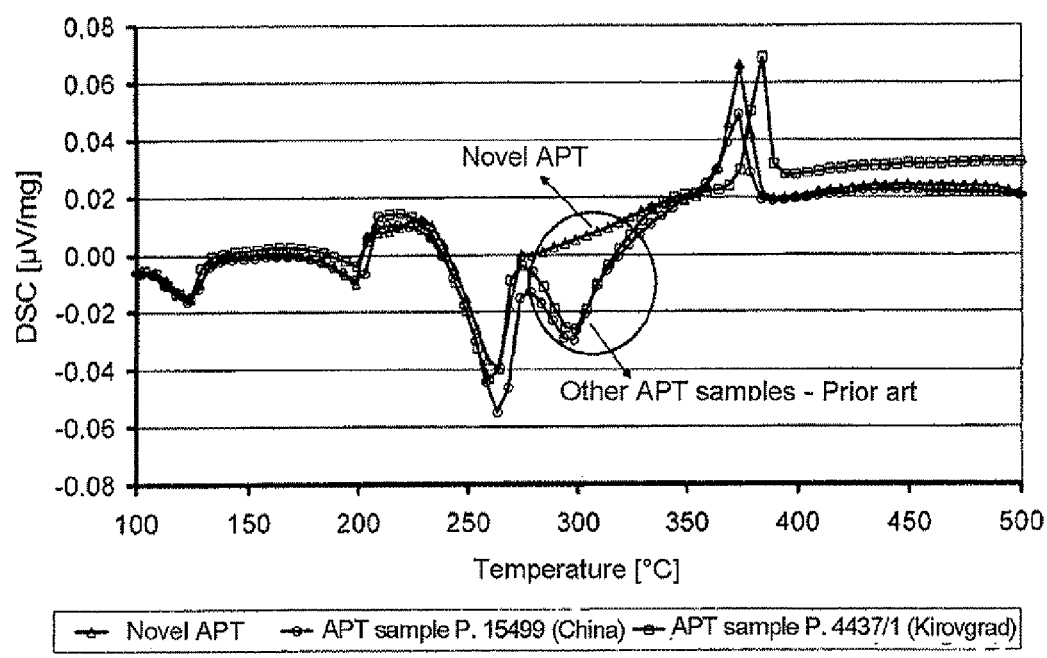
FIG. 1 illustrates a comparison of the differential scanning calorimetric characterization of the novel APT tetrahydrate with that of products of the prior art.

The invention is based on the surprising discovery that ammonium paratungstate decahydrate ("APT decahydrate") in aqueous suspension is converted quantitatively into highly pure ammonium paratungstate tetrahydrate ("APT tetrahydrate") by heating the suspended APT decahydrate. As preferred process parameters, mention may be made of the mass ratio of APT decahydrate to aqueous solution, the $NH_3$ concentration of the resulting aqueous solution, the $NH_3$:W molar ratio of the resulting aqueous solution and the temperature of the thermal treatment.

The present invention provides a process for preparing ammonium paratungstate tetrahydrate by converting ammonium paratungstate decahydrate suspended in an aqueous phase into ammonium paratungstate tetrahydrate by heating.

As starting material for the process of the invention, it is possible to use APT decahydrate prepared in any way.

The patent application having the internal reference number STA 066009 and the same priority date describes a process for preparing coarsely crystalline APT decahydrate. In this process, APT is prepared by re-extraction of a tungsten-laden organic phase with an ammonia-containing aqueous solution. Choice of suitable process parameters makes it possible to prepare a coarsely crystalline APT directly in the re-extraction step. This can be crystallized in high purity and in high yield. Furthermore, the preparative process is simple to carry out and consumes little energy. For the purposes of the description of this patent application having the same priority date, the term ammonium paratungstate hydrate encompasses the tetrahydrate, i.e. $(NH_4)_{10}[H_2W_{12}O_{42}] \times 4(H_2O)$, and the decahydrate, i.e. $(NH_4)_{10}[H_2W_{12}O_{42}] \times 10(H_2O)$. The formation of these hydrates occurs as a function of the temperatures in the re-extraction. The products which can be obtained by the process from the patent application having the same priority date have a comparatively high purity, e.g. >4N. The yield of the crystallization step is, based on the W content of the laden organic phase, >96%. However, this purity is not sufficient for specific applications.

In the process of the present invention, the product prepared by the process described in the patent application STA 066009 having the same priority date (which published as WO 2008/092837) is preferably used as APT decahydrate.

This is an ammonium paratungstate decahydrate which has been prepared directly by re-extraction of a tungsten-laden organic phase with an ammonia-containing aqueous solution in a mixer-settler apparatus, where the re-extraction was carried out at an $NH_3$:W molar ratio of from 0.83 to 1.30, preferably from 0.85 to 0.95, and at a volume feed ratio of the tungsten-laden organic phase to the ammonia-containing aqueous solution of from 5 to 25, preferably from 10 to 15.

Preference is given to an ammonium paratungstate decahydrate which has been prepared by this process and in whose preparation the re-extraction in the mixer is carried out in such a way that a solids concentration of the ammonium paratungstate hydrate, based on the ammonia-containing aqueous phase in the mixer, of from 100 to 1200 g/l, particularly preferably from 500 to 800 g/l, is established.

Preference is likewise given to an ammonium paratungstate decahydrate which has been prepared by this process and in whose preparation the stirring speed in the mixer is set so that an inhomogeneous distribution of organic phase and ammonia-containing aqueous phase is achieved in the mixer.

In a further particularly preferred embodiment, use is made of an ammonium paratungstate decahydrate which has been prepared by this process and in whose preparation the separation of the phase mixture is effected with stirring in a settler equipped with a stirring device, with the rotational speed of the stirring device being set so that organic phase entrained in the sedimentation of the ammonium paratungstate hydrate is separated off and the phase mixture from the mixer preferably being introduced into the phase boundary region between organic phase and ammonia-containing aqueous phase of the settler.

In a further particularly preferred embodiment, use is made of an ammonium paratungstate decahydrate which comprises at least 75% of crystals having a length of at least 200 μm and a ratio of length to width of less than 4.5:1, preferably a product having a bulk density of at least 1.7 g/cm³, preferably from 1.8 to 2.2 g/cm³.

In particular, an ammonium paratungstate decahydrate comprising at least 75% of crystals having a length of from 200 to 1000 μm, preferably from 300 to 400 μm, and a ratio of length to width of from 3.0:1 to 3.5:1 is used as suspended ammonium paratungstate decahydrate.

In a further preferred embodiment of the process of the invention, ammonia- and tungsten-containing solution and/or deionized water, preferably the mother liquor and/or the washing water from the preparation of the ammonium paratungstate tetrahydrate and/or the mother liquor and/or the washing water from the preparation of the ammonium paratungstate decahydrate, very particularly preferably the mother liquor and/or the washing water from the preparation of the ammonium paratungstate decahydrate from the process described in the patent application STA 066009 having the same priority date, is used as aqueous phase or as constituent of the aqueous phase for suspending the ammonium paratungstate decahydrate.

The $NH_3$ concentration of the mother liquor from the preparation of the ammonium paratungstate tetrahydrate is preferably set in the range from 1.5 to 12 g/l of $NH_3$, particularly preferably from 2.0 to 4.0 g/l of $NH_3$.

The $NH_3$:W molar ratio in the mother liquor from the preparation of the ammonium paratungstate tetrahydrate is preferably set in the range from 0.5 to 1.8, particularly preferably from 0.6 to 1.0.

$NH_3$ concentrations and $NH_3$:W molar ratios outside the ranges indicated lead to the incorporation of impurities into the product.

In addition, the differential scanning calorimetry spectrum (DSC spectrum) of the product obtained at $NH_3$ concentrations above 12 g/l displays an endothermic peak in the temperature range 280-340° C.

The mass ratio of APT decahydrate to aqueous phase is preferably set in the range from 0.2:1 to 2.5:1, particularly preferably from 1:1 to 1.8:1.

At mass ratios below the range indicated, deposits are formed on the reactor walls. A mass ratio above the range indicated leads to a deterioration in the product purity.

The thermal treatment of the aqueous suspension of the APT decahydrate is carried out at temperatures and for times which are sufficient to convert the APT decahydrate into APT tetrahydrate.

Preference is given to temperatures of at least 65° C., particularly preferably from 85 to 95° C.

At temperatures below 65° C., pure-phase APT tetrahydrate is not formed. The highest product purity is achieved in the preferred temperature range.

The duration of the thermal treatment has to be sufficient to convert the APT decahydrate completely into APT tetrahydrate at the temperature selected. Typical treatment times are in the range from 0.1 to 6 hours.

The invention also provides a novel ammonium paratungstate tetrahydrate which has a purity of at least 99.999%, in particular a purity of at least 99.9997%, based on the total mass of the product. Products having these purities have hitherto not been described. Such products can be prepared by the above-described process.

The novel ammonium paratungstate tetrahydrates of the present invention differ from the prior art in that no endothermic reaction event occurs in the temperature range from 280 to 340° C. in the differential scanning calorimetric analysis (DSC analysis; heating rate: 10 K/min). A comparison of the differential scanning calorimetric characterization of the novel APT tetrahydrate with that of products of the prior art is shown in FIG. 1.

The invention is illustrated by the examples and figures below. A restriction to these examples and figures is not implied thereby.

Example 1

100 liters of an ammonium- and tungsten-containing solution containing 3.5 g/l of $NH_3$, 45.2 g/l of W and 50 liters of deionized water were placed in a heatable 200 liter stirred reactor. 200 kg of APT decahydrate were added while stirring. The suspension was subsequently treated at 85° C. for three hours while stirring. The $NH_3$ concentration of the liquid phase was 3.5 g/l at an $NH_3$:W molar ratio of 0.83:1. The pH at room temperature was 6.9. The mass ratio of solid to aqueous solution was 1.14:1. After the treatment, the suspension was filtered, the product was washed with 10 liters of deionized water and finally dried at 100° C. The amount of product was 190 kg. This corresponded to a yield of 98.1%.

The analytical data determined on the product are shown in Table 1 below. The analytical data for a standard commercial APT tetrahydrate are also shown in this table.

Example 2

215 liters of deionized water were placed in a heatable 200 liter stirred reactor. 200 kg of APT decahydrate were added while stirring. The suspension was subsequently treated at 90° C. for two hours while stirring. The $NH_3$ concentration of the liquid phase was 2.1 g/l at an $NH_3$:W molar ratio of 0.77:1. The pH at room temperature was 6.8. The mass ratio of solid to aqueous solution was 0.80:1. After the treatment, the suspension was filtered, the product was washed with 10 liters of deionized water and finally dried at 100° C. The amount of product was 184 kg. This corresponded to a yield of 95.3%. The analytical data determined on the product are shown in Table 1.

Analytical data for products of the prior art are shown in Table 2. The analytical data for a standard commercial APT tetrahydrate are also shown in this table.

TABLE 1

Analytical data for the products prepared according to the invention and also for a standard commercial APT product

| | | Example 1 | | Example 2 | | Standard commercial product |
|---|---|---|---|---|---|---|
| | | APT decahydrate[1] | APT tetrahydrate | APT decahydrate[1] | APT tetrahydrate | APT tetrahydrate |
| Al | ppm | <3 | 0.06 | <3 | <0.05 | 2.9 |
| B | ppm | | <0.05 | | <0.05 | — |
| Ba | ppm | | <0.02 | | <0.02 | — |
| Bi | ppm | | <0.02 | | <0.02 | — |
| Ca | ppm | <3 | 0.22 | <3 | 0.12 | 2.5 |
| Cd | ppm | | <0.05 | | <0.05 | — |
| Co | ppm | | <0.02 | | <0.02 | — |
| Cr | ppm | <2 | 0.05 | <2 | 0.04 | 2.1 |
| Cu | ppm | | <0.02 | | <0.02 | — |
| Fe | ppm | <2 | 0.07 | <2 | 0.05 | 2 |
| Ge | ppm | | <0.2 | | <0.2 | — |
| K | ppm | <1 | 0.15 | <1 | 0.10 | 2 |
| Li | ppm | <1 | 0.03 | <1 | 0.01 | 3 |
| Mg | ppm | | <0.05 | | <0.05 | — |
| Mn | ppm | | <0.005 | | <0.005 | — |
| Mo | ppm | <3 | 0.52 | <3 | 0.30 | 4 |
| Na | ppm | <1 | 0.15 | < | 0.13 | 2 |
| Ni | ppm | | <0.02 | | <0.02 | — |
| P | ppm | <1 | 0.24 | <1 | 0.21 | 3.4 |
| Pb | ppm | | <0.02 | | <0.02 | — |
| Sb | ppm | | <0.15 | | <0.05 | — |
| Si | ppm | <2 | 0.3 | <2 | 0.3 | 3.1 |
| Sn | ppm | | 0.37 | | 0.32 | — |
| Sr | ppm | | <0.02 | | <0.02 | — |
| Te | ppm | | <0.05 | | <0.05 | — |
| Th | ppm | | <0.0004 | | <0.0004 | — |
| Ti | ppm | | <0.02 | | <0.02 | — |
| U | ppm | | <0.0004 | | <0.0004 | <1 |
| V | ppm | <1 | 0.031 | <1 | 0.022 | 2 |
| Zn | ppm | | <0.02 | | <0.02 | — |
| Zr | ppm | | <0.05 | | <0.05 | — |
| Purity | % | | >99.9998 | | >99.9997 | >99.99 |
| W | % | 68.63 | 70.45 | 68.69 | 70.44 | 70.38 |
| NH3 | % | 5.24 | 5.42 | 5.25 | 5.43 | 5.43 |

[1] APT decahydrate prepared by the process described in the patent application STA 066009 having the same priority date

TABLE 2

Analytical data for products of the prior art

| | | 1) | 2) | 3) | 4) | 5) | 6) | 7) |
|---|---|---|---|---|---|---|---|---|
| Al | ppm | 5 | 1 | 5 | 1 | 5 | 7 | 5 |
| As | ppm | 10 | 4 | 10 | 7 | 7 | 5 | 11 |
| Bi | ppm | 1 | 0.1 | — | — | 1 | 0.5 | <1 |
| Ca | ppm | 10 | 1 | 5 | 1 | 5 | 5 | 10 |
| Cd | ppm | — | — | 5 | — | 1 | — | <0.5 |

TABLE 2-continued

Analytical data for products of the prior art

|  |  | 1) | 2) | 3) | 4) | 5) | 6) | 7) |
|---|---|---|---|---|---|---|---|---|
| Co | ppm | 10 | 1 | 10 | — | 5 | — | 1 |
| Cr | ppm | 10 | 1 | 10 | 1 | 5 | — | 7 |
| Cu | ppm | 3 | 0.1 | 5 | 1 | 1 | 1 | 5 |
| Fe | ppm | 10 | 3 | 10 | 1 | 10 | 6 | 12 |
| K | ppm | 10 | 10 | 10 | 2 | 9 | 7 | <10 |
| Mg | ppm | 7 | 1 | 5 | 1 | 5 | 7 | <1 |
| Mn | ppm | 10 | 1 | 5 | 1 | 5 | 1 | <0.5 |
| Mo | ppm | 20 | 7 | 30 | 6 | 20 | 14 | 27 |
| Na | ppm | 10 | 5 | 10 | 5 | 9 | 8 | <10 |
| Ni | ppm | 7 | 1 | 5 | 1 | 5 | — | 0.8 |
| P | ppm | 7 | 5 | 7 | 7 | 5 | 7 | 12 |
| Pb | ppm | 1 | 0.5 | 5 | — | 1 | 0.5 | 1 |
| S | ppm | 7 | 7 | 7 | — | 5 | — | 0.02 |
| Sb | ppm | 8 | 1 | — | — | 2 | — | 0.4 |
| Si | ppm | 10 | 3 | 10 | 1 | 8 | 6 | 8 |
| Sn | ppm | 1 | 0.3 | 10 | 1 | 1 | 0.5 | 4 |
| Ti | ppm | 10 | 3 | 10 | — | — | — | <1 |
| V | ppm | 10 | 3 | 10 | — | — | — | <1 |
| F | ppm | — | — | 25 | — | — | — | — |
| Li | ppm | — | — | 5 | — | — | — | — |
| Nb | ppm | — | — | 10 | — | — | — | <3 |
| Purity | % | 99.9823 | 99.9941 | 99.9776 | 99.9963 | 99.9885 | 99.9925 | >99.9868 |

1) Chinese National Standard GB 10116-88
2) Excellent Chinese Grade (Hegdu Tungstend)
3) Specification Wolfram Bergbau und Hüttengesellschaft m.b.H.
4) Osram Sylvania
5) Fujan Xiamen Tungsten Products Plant
6) Chinese Production, Jiangxi Province
7) Sample: Alloys Plant Kirovgrad, Russia The information for 1)-6) comes from "TUNGSTEN Properties Chemistry, Technology of the Element, Alloys and Chemical Compound (ISBN 0-306-45053-4, 1999), Lassner, Schubert, p. 210.

Example 3

Figure 2:
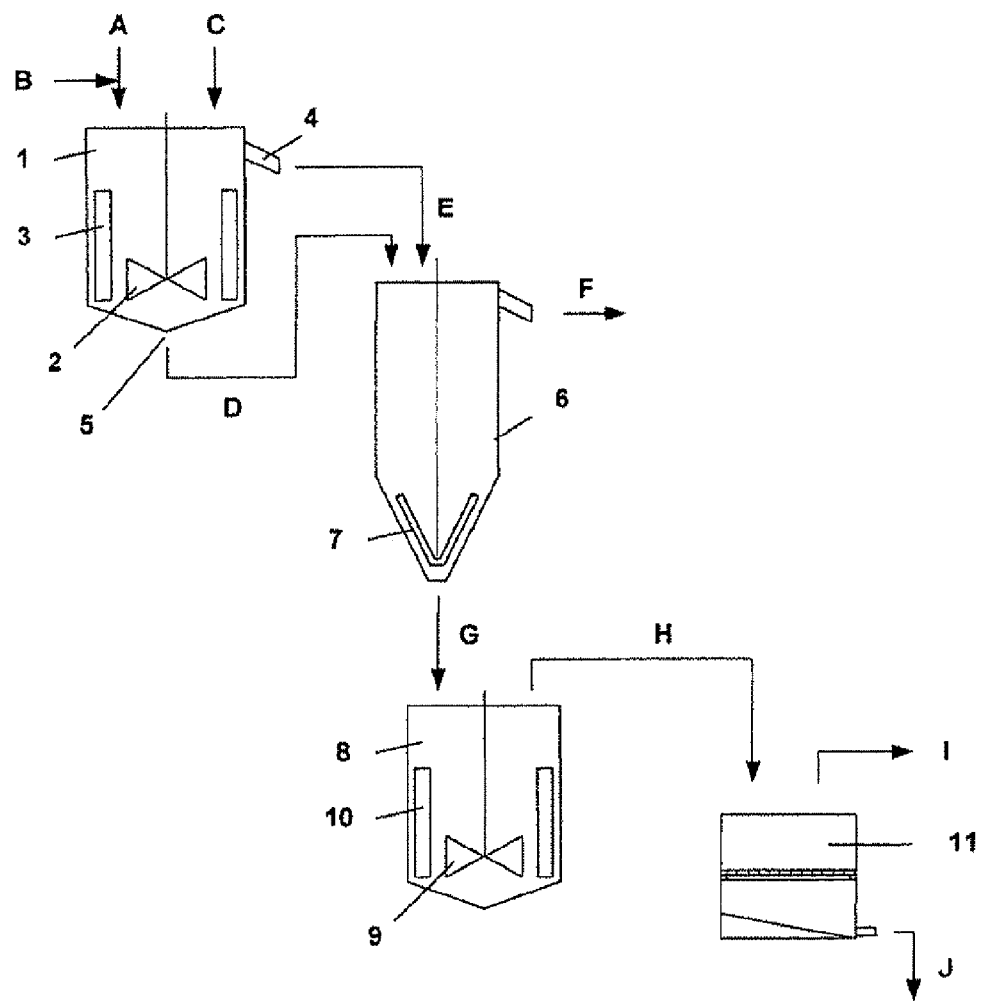
FIG. 2 illustrates an apparatus that can be used in the process of the invention.

This example shows the preparation of APT tetrahydrate according to the invention using the apparatus described in FIG. 2. The process of the invention is carried out in part of the apparatus shown in FIG. 2.

W concentrate was digested with sodium hydroxide or sodium carbonate and the resulting solution was freed of impurities such as P, As, Si, V and Mo in a preliminary purification with addition of Mg salts, Al salts and sodium hydrogensulfide. As further purification step to remove anionic and cationic impurities still present, a liquid-liquid extraction using an organic phase (7-10% of diisotridecylamine, 10% of isodecanol, balance: petroleum spirit) was carried out. The tungsten-laden organic phase ("OP") was re-extracted with $NH_3$ solution. The apparatus used for this purpose is shown in FIG. 2.

400 l/h of W-laden OP and $NH_3$ solution were fed continuously via lines A, B and C into a stirred vessel (1) equipped with a stirrer (2) and baffles (3) (also referred to as vessel) (volume: 250 l, diameter: 600 mm, inclined-blade stirrer: 6 blades, diameter: 300 mm, 4 baffles) in the region of the stirrer. Water was introduced via line B in order to set a specific $NH_3$ concentration. The W concentration of the OP and the $NH_3$ concentration of the $NH_3$ solution were measured automatically in-line. The feed rate of the $NH_3$ solution was regulated automatically via the $NH_3$:W molar ratio fixed at 0.90. The OP/$NH_3$ solution feed ratio was set to 15:1 and likewise regulated automatically via an additional stream of water into the $NH_3$ feed line.

The volume flow of the OP was set to a fixed value. The volume flow of the $NH_3$ solution was regulated as a function of the volume flow of the OP, the instantaneously measured W and $NH_3$ concentrations and the $NH_3$:W molar ratio set. The $H_2O$ volume flow was regulated as a function of the volume flow of the $NH_3$ solution and the feed ratio of the starting materials. The temperature in the vessel (1) was set to 48° C. and regulated by temperature control of the feed solutions.

The transfer of the 3-phase mixture formed in the vessel (1) to the settler (6) was effected from the stirrer region of the vessel via the outlet (5) and line D and also via the free overflow (4) of the vessel and line E. The steady-state OP/AP ratio of ⅛ in the vessel (1), the emulsion type "oil-in-water" and the steady-state solids concentration of 250 g/l were set via the rotational speed of the stirrer (210 rpm), the offtake of the phase mixture from the lower region of the vessel (50 l/h) and the recirculation of aqueous phase from the settler (6) to the vessel (1) (20 l/h) The residence time of the AP in the vessel (1) was 4.8 hours and that of the OP was 4.2 minutes. The phase mixture was separated in the settler (6) equipped with a stirrer (7) (volume: 600 l, diameter: 750 mm (shape: above half of the height tapering conically; equipped with an anchor running around the wall (tapering obliquely)). The rotational speed of the stirrer of the settler (6) was set to 15 rpm. The stripped OP was separated off via the overflow of the settler via line F, washed with water and recirculated to the loading stage of the liquid-liquid extraction. The product suspension having a solids content of 1314 g/l was transferred from the lower region of the settler (6) via line G to an intermediate vessel (8) equipped with a stirrer (9) and baffles (10) in which the process of the invention was carried out. This intermediate vessel (8) thus contained an aqueous suspension of ammonium paratungstate decahydrate crystals. The interior of the intermediate vessel (8) was heated. This led to conversion of the APT decahydrate into APT tetrahydrate. This product was transferred as an aqueous crystal mixture via line H to the filter (11) and the APT×4H$_2$O was washed with a little water in order to displace the mother liquor. The product was discharged from the process via line I, subsequently dried at 60° C. and characterized.

The mother liquor containing 35 g/l of W and 7.0 g/l of NH$_3$ was discharged from the filter (11) via line J and, after the NH$_3$ had been separated off, added to the digestion solution from the W concentrates.

The invention claimed is:

1. A process for preparing ammonium paratungstate tetrahydrate which comprises converting ammonium paratungstate decahydrate suspended in an aqueous phase into ammonium paratungstate tetrahydrate by heating to a temperature of at least 65° C., wherein said suspended ammonium paratungstate decahydrate is an ammonium paratungstate decahydrate comprising at least 75% of crystals having a length of at least 200 μm and a ratio of length to width of less than 4.5:1 a product having a bulk density of at least 1.7 g/cm$^3$.

2. The process as claimed in claim 1, wherein a mother liquor is formed and has an NH$_3$ concentration in the range from 1.5 to 12 g/l of NH$_3$.

3. The process as claimed in claim 2, wherein the mother liquor formed has an NH$_3$:W molar ratio in the range from 0.5 to 1.8.

4. The process as claimed in claim 2, wherein the mass ratio of ammonium paratungstate decahydrate to mother liquor is set in the range from 0.2:1 to 2.5:1.

5. The process as claimed in claim 1, wherein a mother liquor is formed and has an NH$_3$ concentration in the range from 2.0 to 4.0 g/l of NH$_3$.

6. The process as claimed in claim 5, wherein the mother liquor formed has an NH$_3$:W molar ratio in the range from 0.6 to 1.0.

7. The process as claimed in claim 6, wherein the mass ratio of ammonium paratungstate decahydrate to mother liquor is set in the range from 1:1 to 1.8:1.

8. The process as claimed in claim 1, wherein said suspended ammonium paratungstate decahydrate is an ammonium paratungstate decahydrate which is prepared directly by re-extracting a tungsten-laden organic phase with an ammonia-containing aqueous solution in a mixer-settler apparatus, where the re-extracting is carried out at an NH$_3$:W molar ratio of from 0.83 to 1.30, and at a volume feed ratio of the tungsten-laden organic phase to the ammonia-containing aqueous solution of from 5 to 25.

9. The process as claimed in claim 8, wherein the re-extraction in the mixer is carried out in such a way that a solids concentration of the ammonium paratungstate hydrate, based on the ammonia-containing aqueous phase in the mixer, of from 100 to 1200 g/l is established.

10. The process as claimed in claim 8, wherein the stirring speed in the mixer is set so that an inhomogeneous distribution of organic phase and ammonia-containing aqueous phase is achieved in the mixer.

11. The process as claimed in claim 8, wherein the separation of the phase mixture is effected with stirring in a settler equipped with a stirring device and in that the rotational speed of the stirring device is set so that organic phase entrained in the sedimentation of the ammonium paratungstate hydrate is separated off, with the phase mixture from the mixer being introduced into the phase boundary region between organic phase and ammonia-containing aqueous phase in the settler.

12. The process as claimed in claim 8, wherein said suspended ammonium paratungstate decahydrate is an ammonium paratungstate decahydrate comprising at least 75% of crystals having a length of from 300 to 400 μm, and a ratio of length to width of from 3.0:1 to 3.5:1 and a product having a bulk density of from 1.8 to 2.2 g/cm$^3$.

13. The process as claimed in claim 1, wherein ammonia- and tungsten-containing solution and/or deionized water from the preparation of the ammonium paratungstate tetrahydrate and/or the mother liquor and/or the washing water from the preparation of the ammonium paratungstate decahydrate, is used as aqueous phase or as constituent of the aqueous phase for suspending the ammonium paratungstate decahydrate.

14. The process as claimed in claim 1, wherein ammonia- and tungsten-containing mother liquor and/or the washing water from the preparation of the ammonium paratungstate tetrahydrate and/or the mother liquor and/or the washing water from the preparation of the ammonium paratungstate decahydrate, is used as aqueous phase or as constituent of the aqueous phase for suspending the ammonium paratungstate decahydrate.

15. A process for preparing ammonium paratungstate tetrahydrate which comprises converting ammonium paratungstate decahydrate suspended in an aqueous phase into ammonium paratungstate tetrahydrate by heating to a temperature from 85 to 95° C.

16. The process as claimed in claim 15, wherein said suspended ammonium paratungstate decahydrate is an ammonium paratungstate decahydrate which is prepared directly by re-extracting a tungsten-laden organic phase with an ammonia-containing aqueous solution in a mixer-settler apparatus, where the re-extracting is carried out at an NH$_3$:W molar ratio of from 0.85 to 0.95, and at a volume feed ratio of the tungsten-laden organic phase to the ammonia-containing aqueous solution of from 10 to 15.

17. The process as claimed in claim 16, wherein the re-extraction in the mixer is carried out in such a way that a solids concentration of the ammonium paratungstate hydrate, based on the ammonia-containing aqueous phase in the mixer, of from 500 to 800 g/l, is established.

18. A process for preparing ammonium paratungstate tetrahydrate which comprises converting ammonium paratungstate decahydrate suspended in an aqueous phase into ammonium paratungstate tetrahydrate by heating to a temperature of at least 65° C. and said suspended ammonium paratungstate decahydrate is an ammonium paratungstate decahydrate which is prepared directly by re-extracting a tungsten-laden organic phase with an ammonia-containing aqueous solution in a mixer-settler apparatus, where the re-extracting is carried out at an NH$_3$:W molar ratio of from 0.83 to 1.30, and at a volume feed ratio of the tungsten-laden organic phase to the ammonia-containing aqueous solution of from 5 to 25, wherein said suspended ammonium paratungstate decahydrate is an ammonium paratungstate decahydrate comprising at least 75% of crystals having a length of from 200 to 1000 μm, and a ratio of length to width of from 3.0:1 to 3.5:1.

* * * * *